Oct. 23, 1962 R. D. JOHNSTON 3,059,418
HYDROSTATIC BEARING MEANS FOR AN ENGINE DRIVE MECHANISM
Filed March 7, 1961 3 Sheets-Sheet 1

INVENTOR.
Robert D. Johnston
BY
E. W. Christie
ATTORNEY

INVENTOR.
Robert D. Johnston
BY
E. W. Christen
ATTORNEY

Oct. 23, 1962 R. D. JOHNSTON 3,059,418
HYDROSTATIC BEARING MEANS FOR AN ENGINE DRIVE MECHANISM
Filed March 7, 1961 3 Sheets-Sheet 3

INVENTOR.
Robert D. Johnston
BY
E. W. Christen
ATTORNEY

United States Patent Office 3,059,418
Patented Oct. 23, 1962

3,059,418
HYDROSTATIC BEARING MEANS FOR AN ENGINE DRIVE MECHANISM
Robert D. Johnston, Brownsburg, Ind., assignor to General Motors Corporation, Detroit, Mich., a corporation of Delaware
Filed Mar. 7, 1961, Ser. No. 93,947
9 Claims. (Cl. 60—24)

This invention relates to drive mechanisms, and more particularly to a drive mechanism for a Stirling cycle external combustion engine.

The Stirling cycle external combustion engine has come into recent prominence due to advances in technology which make it feasible to manufacture such a device economically. The present Stirling cycle engine is provided with a displacer piston and a power piston, having piston rods coaxially disposed and extending into a crankcase where they are suitably connected to twin crankshafts. The crankshafts rotate in opposite directions to proivde both a power source and a means for maintaining the proper relative motion between the displacer piston and the power piston. With engines of this type, it has been found that it is necessary to maintain symmetrical forces on the various parts of the drive mechanism in order to provide the proper power transmission through the twin crankshafts, and to maintain the necessary phase relationship between the pistons. Theoretically, the forces are directed axially and no side thrust or friction forces would be imposed on the driving mechanism. However, from a practical standpoint, friction is introduced into the system and manufacturing tolerances and clearances are required in manufacture and the practice becomes quite different from the theory. Friction introduced into the system and stack-up of tolerances and clearances causes side thrust forces in the system which destroy the proper power transmission, as well as the phase relationship between the displacer and power pistons. This has been overcome through the use of gears mounted on the twin crankshafts and meshing with each other, which does not permit one crankshaft to rotate faster than the other and which serves to take up the side thrust forces. Other means have been devised for accomplishing this purpose.

The device in which this invention is embodied comprises, generally, a Stirling cycle engine having the power piston rod and the displacer piston rod guided in the crankcase of the engine and having hydrostatic bearings between the fixed guides and the piston rods. The usual connecting rods and crankshaft assemblies are provided, the construction eliminating the necessity of gears or other means for eliminating or taking up the side thrust forces in the coaxial drive construction. Not only are the side thrust forces eliminated but the phase relationship between the displacer piston and the power piston is better maintained, leading to a more efficient operation and a better engine.

These and other advantages will become more apparent from the following description and drawings, in which.

Figure 1:
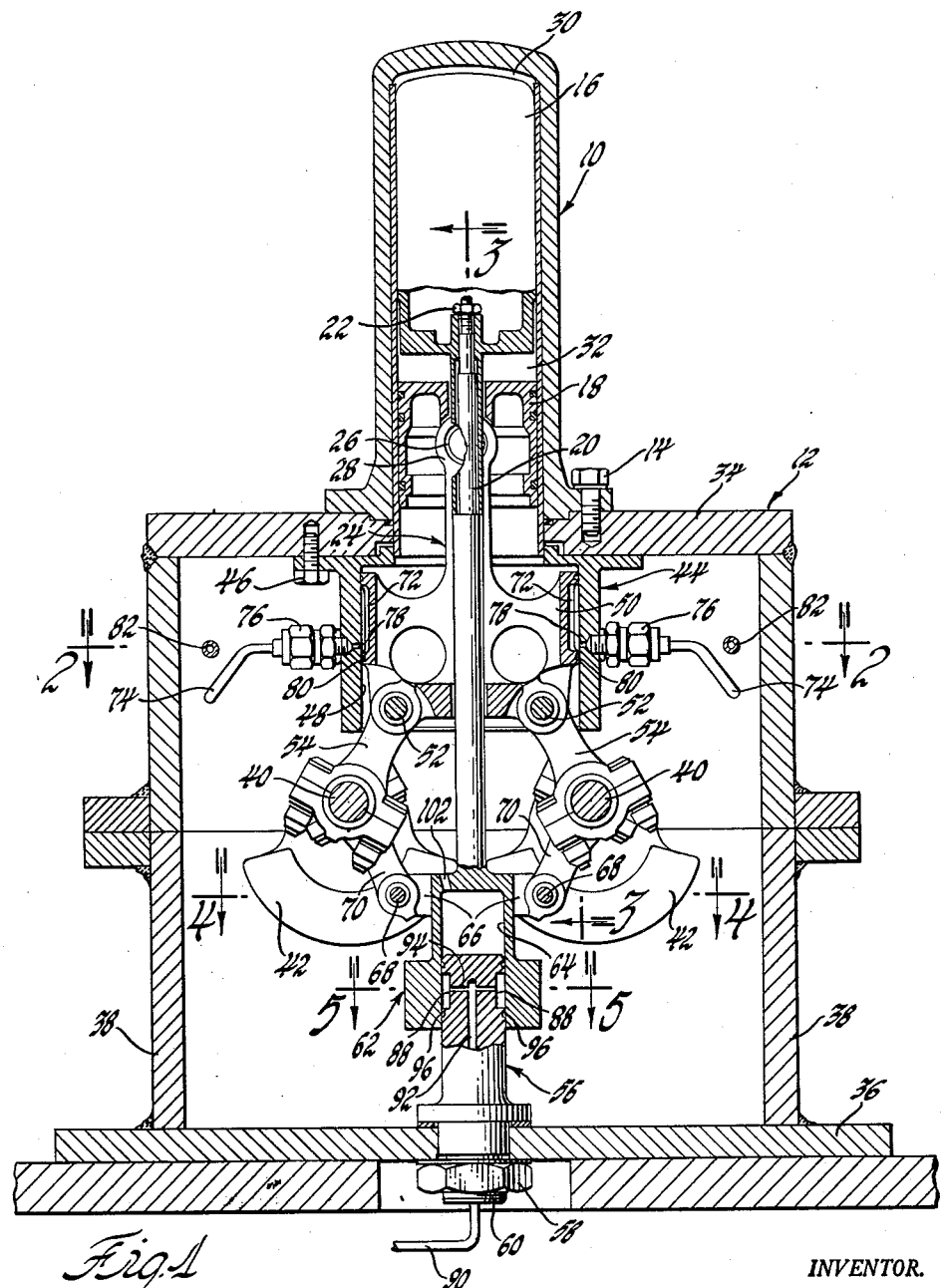
FIGURE 1 is a sectional view of a typical Stirling cycle external combustion engine and employing the improved drive mechanism embodying this invention.
Figure 2:
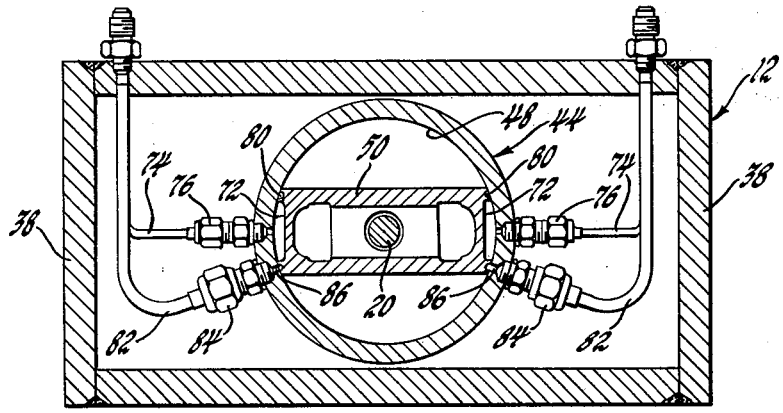
FIGURE 2 is a cross-sectional view of a portion of the drive mechanism of the engine illustrated in FIGURE 1 taken substantially along the line 2—2 of FIGURE 1 and looking in the direction of the arrows.
Figure 4:
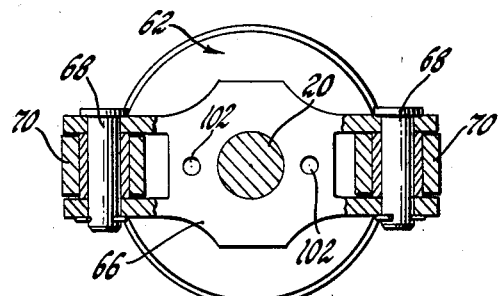
FIGURE 4 is a view of a portion of the drive mechanism illustrated in FIGURE 1 taken substantially along the line 4—4 of FIGURE 1 and looking in the direction of the arrows.
Figure 3:
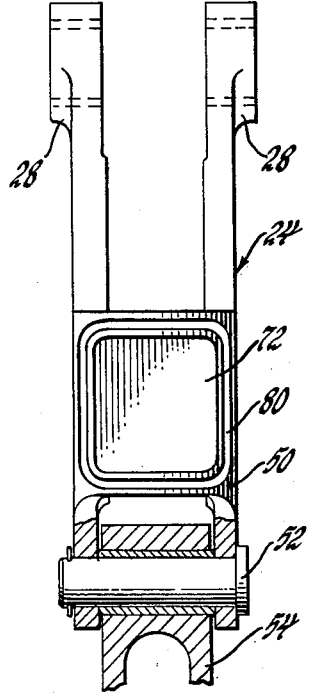
FIGURE 3 is a view of a portion of the drive mechanism illustrated in FIGURE 1 taken substantially along the line 3—3 of FIGURE 1 and looking in the direction of the arrows.

Referring more particularly to the drawings, FIGURE 1 best illustrates a Stirling cycle engine and the more important parts thereof. A cylinder 10 is adapted to be mounted in some suitable manner on a crankcase 12, as by bolts or studs 14. Cylinder 10 has reciprocably mounted therein a displacer piston 16 and a power piston 18. A displacer piston rod 20 is secured to the displacer piston 16 in any suitable manner, as by a nut 22, and the displacer piston rod 20 extends downwardly into the crankcase 12. A power piston rod 24 is secured in some suitable manner to power piston 18, as by wrist pins 26 secured in the piston and in ears 28 formed at the top of the power piston rod 24. The power piston rod 24 is coaxial with and extends downwardly around the displacer piston rod 20 and into the crankcase 12. The displacer piston 16 and power piston 18 reciprocate in cylinder 10 with a desired phase relationship, the displacer piston 16 serving to transfer a working fluid from a hot space 30 above the displacer piston 16 to a cold space 32 between the displacer piston 16 and the power piston 18. This is the usual operation of a typical Stirling cycle engine.

Crankcase 12 may be formed in any suitable manner and is illustrated to include an upper plate 34 and a lower plate 36 separated by side walls 38. Extending into crankcase 12 are a pair of crankshafts 40 which are adapted to rotate in opposite directions and to provide the driving power output from the engine. Crankshafts 40 may be provided with balancing weights 42 and are, in general, of the usual crankshaft construction.

Mounted on the upper plate 34 of the crankcase 12 and within the crankcase is a power piston rod guide, illustrated generally by the numeral 44, secured to the plate 34 in any suitable manner, as by bolts 46. Guide 44 is provided with an internal bore 48, which may be of any suitable cross-sectional configuration and is shown for illustration purposes to be cylindrical. Guide 44 and opening 48 receive an enlarged portion 50 of the power piston rod 24. Enlargement 50 is provided with surfaces corresponding to the surfaces of the bore 48 and is reciprocable therein. At the lower end of the enlargement 50, wrist pins or pivot pins 52 connect the power piston through connecting rods 54 to the twin crankshafts 40. Connecting rods 54 may be of any suitable construction and are shown to include the usual two parts straddling the crankshafts and connected by bolts.

At the lower end of the crankcase 12 a displacer piston guide shaft 56 may be secured in any suitable manner to the lower plate 36, as by means of nut 58 on the threaded end 60. The lower end of the displacer piston rod 20 is provided with an enlargement 62 which has a bore 64 formed therein and of substantially the same cross-sectional configuration as the guide shaft 56. Ears 66 may be formed on the enlargement 62 to receive wrist pins or pivot pins 68 serving to connect the displacer piston rod 20 to the crankshafts 40 through suitable connecting rods 70.

It is easily seen that upon rotation of the crankshafts 40 the displacer piston 16, acting through the displacer piston rod 20, and the power piston 18, acting through the power piston rod 24, will reciprocate with a definite phase relationship. It is also to be noted that this reciprocation is purely axial of the piston rods and theoretically there should be no side thrust forces caused by the motion of the pistons in the cylinder or by the action of the various connecting rods on the crankshaft. This is because the drive mechanism thus far described is symmetrical. However, any friction introduced into the system or a stack-up of manufacturing tolerances and clearances might provide side thrust forces on the mechanism which would either destroy the proper phase relationship of the pistons or be detrimental to the power transmission through the crankshafts.

In order to overcome these problems, hydrostatic bearings are utilized between the power piston rod guide 44 and the power piston rod 24 and between the displacer piston rod guide 56 and the displacer piston 20.

The enlarged portion 50 of the power piston rod 24 which reciprocates in the guide 44, may be provided with hollowed-out pockets 72 at the surfaces of the enlargement 50 adjacent the surfaces of the bore 48 in the guide 44. Bearing pockets 72 are maintained full of a pressurized fluid, such as oil, which enters through conduits 74 and fittings 76. Openings 78 in the wall of the guide 44 communicate directly with the pockets 72. The hydrostatic fluid may fill the pockets 72 with any suitable pressure, such as five pounds per square inch, and serves to prevent sideward movement of the enlargement 50 in the bore 48. This is due to the incompressibility of the hydrostatic fluid.

A groove or continuous loop 80 is also formed in the enlargement 50 of the power piston rod 24 and completely surrounds the bearing pockets 72. A rib is thus maintained between the groove 80 and the bearing pockets 72 which remains closely adjacent the walls of the bore 48. Grooves 80 are provided with a hydrostatic fluid through conduits 82 and fittings 84, communicating with the grooves 80 through suitable holes 86 formed in the wall of the guide 44. The pressure of the fluid in the grooves 80 is greater than the pressure of the fluid in pockets 72 and may be in the neighborhood of thirty pounds per square inch. This provides an effective fluid seal to prevent leakage of the pressurized fluid in pockets 72 past the enlargement 50 of the power piston rod 24. The higher pressured groove prevents the passage of low pressure fluid thereby.

Figure 5:
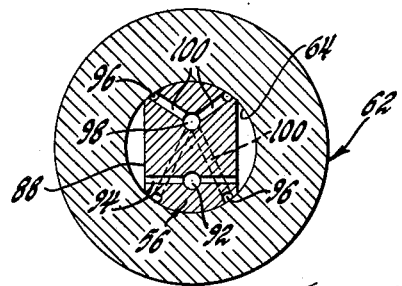
FIGURE 5 is a view of a portion of the drive mechanism illustrated in FIGURE 1 taken substantially along the line 5—5 of FIGURE 1 and looking in the direction of the arrows.

Displacer piston rod 20 is also provided with similar bearing means, as illustrated in FIGURES 1 and 5. Bearings pockets 88 may be formed in the displacer piston guide 56. These pockets are supplied with hydrostatic fluid through an inlet tube 90 communicating with a passage 92 in the guide 56 which in turn communicates with pockets 88 through cross passages 94. Grooves 96 forming closed loops about the pockets 88 may also be provided, and supplied with a hydrostatic fluid under a higher pressure from any suitable source, communicating with a bore 98, communicating with the grooves 96 through cross passages 100. The pressure of the fluid in grooves 96 is greater than the pressure of the fluid in pockets 88, thus effectively sealing pockets 88 from loss of fluid. In order to permit movement of the enlargement 62 of the displacer piston rod 20 over the displacer piston guide shaft 56, a bore or bores 102 may be provided, communicating between the crankcase and the chamber above the piston guide 56 and defined by the opening 64. This permits a free movement of air as the piston rod 20 reciprocates.

Figure 6:
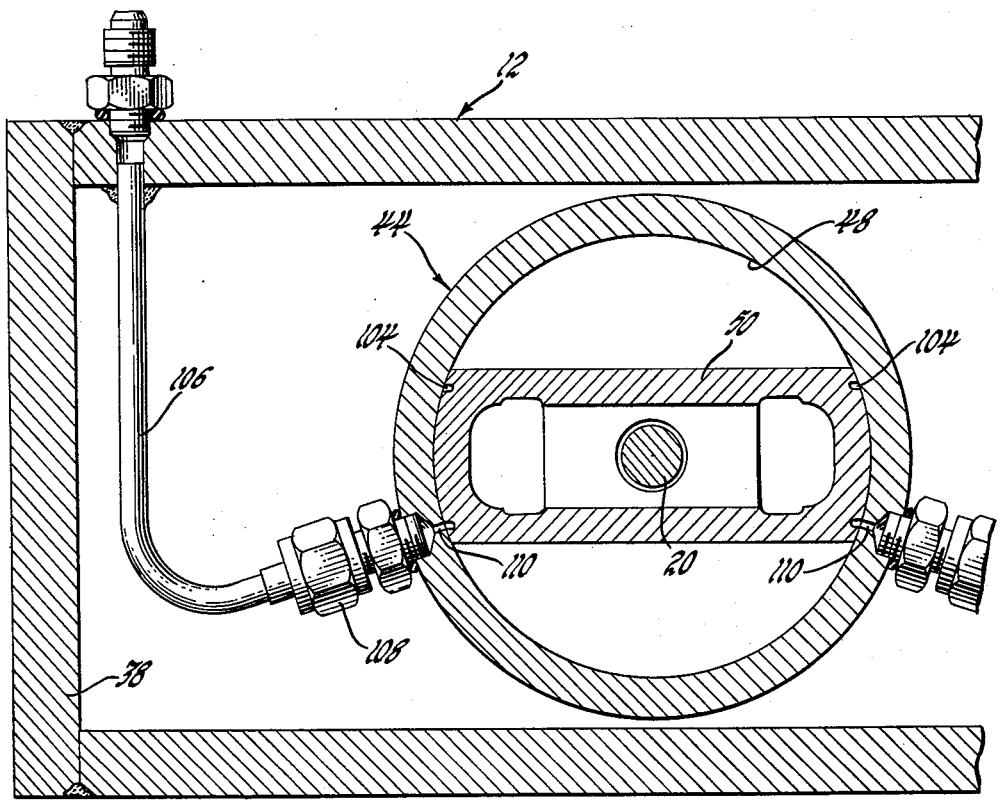
FIGURE 6 is a cross-sectional view of a modification of the drive mechanism illustrated in FIGURE 1.
Figure 7:
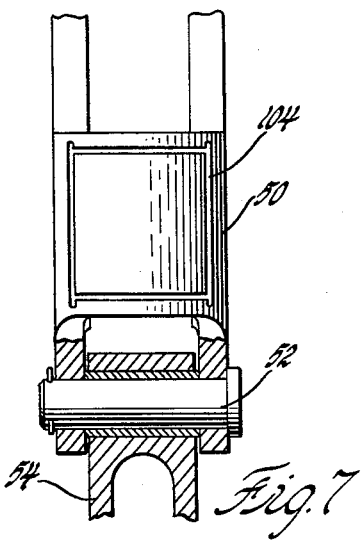
FIGURE 7 is a view of a power piston rod assembly modified in accordance with the structure illustrated in FIGURE 6.

A modification of the bearing means is illustrated in FIGURES 6 and 7. In this instance power piston rod enlargement 50 is provided only with a groove 104 forming a closed loop in the surface adjacent the wall of the piston rod guide 44. A single pressure supply, as through conduit 106 and fitting 108, communicates wih the grooves 104 through passages 110 formed through the wall of the guide 44. In this instance the fluid in the grooves 104 supplies sufficient pressure to take up or eliminate the side thrust forces imparted to the piston rod 24 caused by the stack-up of clearances and tolerances or by friction introduced into the system.

It is to be understood that the modification above described with respect to FIGURES 6 and 7 and relating to the enlargement 50 of the power piston rod 24 could equally well be applied to the bearing means between the displacer piston rod 20 and the displacer piston rod guide 26. It is further to be understood that the bearing pockets and grooves could be formed in the guide members as well as in the piston rod members without departing from the scope of the invention.

Thus, a drive mechanism is provided which eliminates the problem of side thrust forces introduced into a symmetrical system because of manufacturing tolerances and clearances and such as might be caused by friction or wear in the system. The drive mechanism is relatively simple to manufacture and assemble and yet is positive in its action. This eliminates a number of complex parts as well as the attendant complex manufacturing and assembly disadvantages and problems.

What is claimed is:

1. In a drive mechanism for a Stirling cycle engine of the type having a reciprocable power piston rod and a reciprocable displacer piston rod extending into a crankcase, the improvement comprising a power piston rod guide member mounted in said crankcase and including a pair of bearing surfaces facing each other, said power piston rod being reciprocable in said guide member and having a pair of opposite bearing surfaces formed thereon for engagement with said guide member bearing surfaces, and hydrostatic bearing means comprising cavity means formed in said bearing surfaces of said power piston rod and means supplying hydrostatic fluid to said cavity means, said hydrostatic bearing means thereby accommodating side forces on said power piston rod during operation thereof.

2. The drive mechanism set forth in claim 1 and wherein each of said cavity means includes a pocket formed in said power piston rod bearing surface and a groove surrounding said pocket, said pocket receiving fluid at a low pressure and said groove receiving fluid at a pressure higher than the pressure of the fluid in said pocket to seal said pocket from pressure loss.

3. The drive mechanism set forth in claim 1 and wherein said cavity means comprises a groove defining a closed loop formed in each of said bearing surfaces of said power piston rod.

4. In a drive mechansim for a Stirling cycle engine of the type having a power piston rod and a displacer piston rod extending into a crankcase, the improvement comprising a power piston rod guide having an opening therein and mounted in said crankcase, said power piston rod having surfaces adjacent said opening in said guide and reciprocably mounted therein, first hydrostatic bearing means formed in said surfaces of said power piston rod, means supplying fluid to said first bearing means, a displacer piston rod guide mounted in said crankcase and receiving said displacer piston rod, second hydrostatic bearing means formed in said displacer piston rod, and means for supplying fluid to said second bearing means, said first and second bearing means accommodating side forces on said power piston rod and said displacer piston rod during operation thereof.

5. The drive mechanism set forth in claim 4 and wherein said first and second bearing means includes pockets formed in said power piston rod and said displacer piston rod and grooves formed in said power piston rod and said displacer piston rod surrounding each of said pockets, said pockets receiving fluid at a low pressure and said grooves receiving fluid at a pressure higher than the pressure of the fluid in said pockets to seal said pockets from pressure loss.

6. The drive mechanism set forth in claim 4 and wherein said first and second bearing means includes a groove defining a closed loop formed in each of said surfaces of said power piston rod and said displacer piston rod and receiving fluid under pressure from said fluid supply means to support said power piston rod and said displacer piston rod from said guides.

7. In a drive mechanism for a Stirling cycle engine of the type having a power piston rod and a displacer piston rod extending into a crankcase, the improvement comprising a power piston rod guide having an opening therein providing facing bearing surfaces and mounted in said crankcase, said power piston rod reciprocable in said guide and having opposite bearing surfaces formed thereon complementary to said guide bearing surfaces, and hydrostatic bearing means comprising cavity means between said bearing surfaces and means supplying hydrostatic fluid to said cavity means, said bearing means accommodating side forces on said power piston rod during operation thereof.

8. The drive mechanism set forth in claim 7 and wherein said cavity means includes pockets and grooves surrounding each of said pockets, said pockets receiving fluid at a low pressure and said grooves receiving fluid at a pressure higher than the pressure of the fluid in said pockets to seal said pockets from pressure loss.

9. The drive mechanism set forth in claim 7 and wherein said bearing means comprises a pair of grooves each defining a closed loop formed in said power piston rod guide and on opposite sides thereof and receiving fluid under pressure from said fluid supply means to support said power piston rod from said guides.

References Cited in the file of this patent

UNITED STATES PATENTS

| | | |
|---|---|---|
| 2,885,855 | Meyer | May 12, 1959 |
| 2,907,304 | Macks | Oct. 6, 1959 |